Nov. 5, 1946.                H. W. BROOKS                 2,410,709
                              FOOD CHOPPER
                          Filed Nov. 29, 1943           2 Sheets-Sheet 1
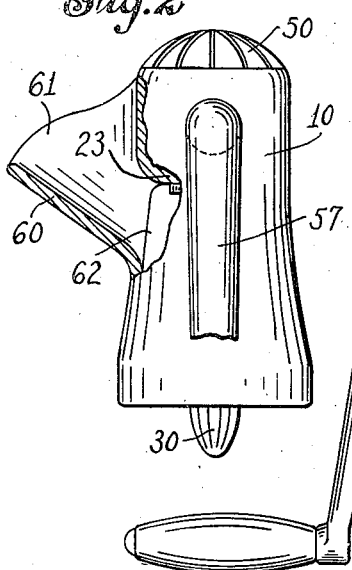
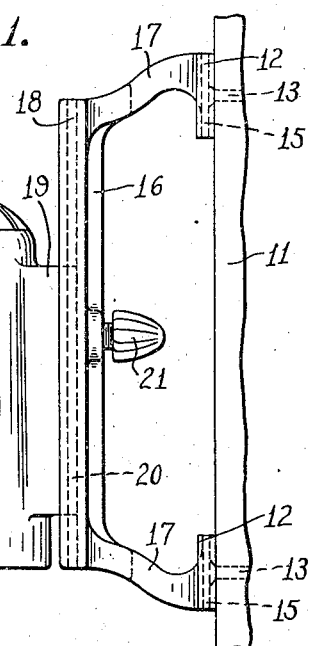
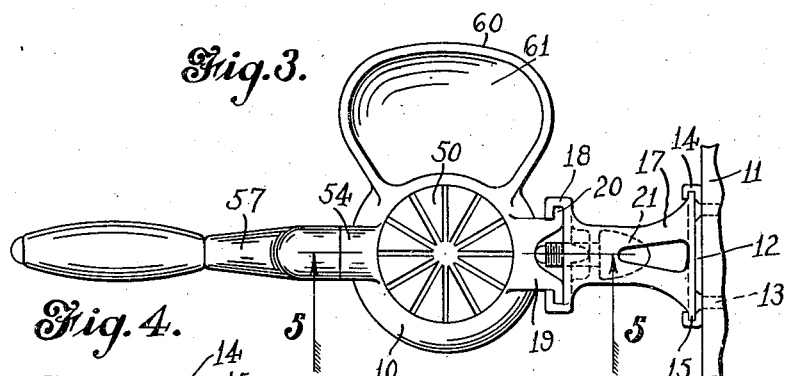
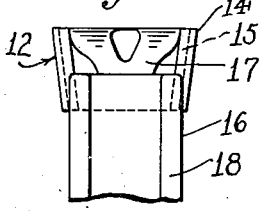
Inventor
Herbert W. Brooks
By Rockwell-Bachelow
Attorneys Nov. 5, 1946. H. W. BROOKS 2,410,709
FOOD CHOPPER
Filed Nov. 29, 1943 2 Sheets-Sheet 2

Inventor
Herbert W. Brooks
By Rockendt Buschotow
Attorney

Patented Nov. 5, 1946

2,410,709

UNITED STATES PATENT OFFICE 2,410,709

FOOD CHOPPER

Herbert W. Brooks, West Haven, Conn., assignor to Sargent & Company, New Haven, Conn., a corporation of Connecticut Application November 29, 1943, Serial No. 512,083

5 Claims. (Cl. 146—192)

This invention relates to food choppers, and while the principles of the invention are applicable in other relations, the invention is illustrated and described as applied to a household food chopper for the grinding or chopping of meats and other food products.

The invention relates particularly to a food chopper of this character adapted to be mounted with the axis of the device in a vertical plane as distinguished from the usual form of chopper which is horizontally disposed. It is sometimes advantageous in the use of devices of this character that they be disposed so that the products to be ground are delivered from the device at its lower portion, and it is also convenient to provide for the support of a food chopper so that it may be mounted upon a wall or the like and be readily detachable from its support.

Many of the food choppers now in use are provided with clamping screws or the like so that they may be clamped to a horizontal surface. It is contemplated by the present invention to provide a food chopper which may be mounted upon a wall or other vertical surface by means of wall brackets or plates, the arrangement being such that the device may be readily removed from its supports for storage purposes, and be easily mounted in plate when its use is desired. Thus the mounting plates may remain in plate upon the wall and the food chopper readily removed therefrom if desired for the purpose of storage or cleaning.

A food chopper with its axis vertically disposed lends itself particularly well to this arrangement, and is also convenient in that the products will drop from the bottom of the chamber or housing, and may, therefore, be readily caught or collected. In addition, the working parts of the device are so arranged that they may be easily removed from the casing to be cleaned, and also easily replaced and adjusted for use.

One object of the invention is to provide a food chopper of novel construction.

A still further object of the invention is to provide a food chopper and means for supporting the same, with the axis thereof in a vertical position.

Still another object of the invention is to provide a vertically disposed food chopper which may be readily secured to a wall or the like by supporting brackets or plates from which the article may be easily removed when desired.

To these and other ends the invention consists in the novel features and combinations of parts to be hereinafter described and claimed.

In the accompanying drawings:

Fig. 1 is a side elevational view of a food chopper embodying my improvements;

Fig. 2 is a front view of the casing of the device with some parts being broken away;

Fig. 3 is a top plan view of the food chopper;

Fig. 4 is a detail view of one of the wall mounting plates and the associated supporting member;

Figure 5:
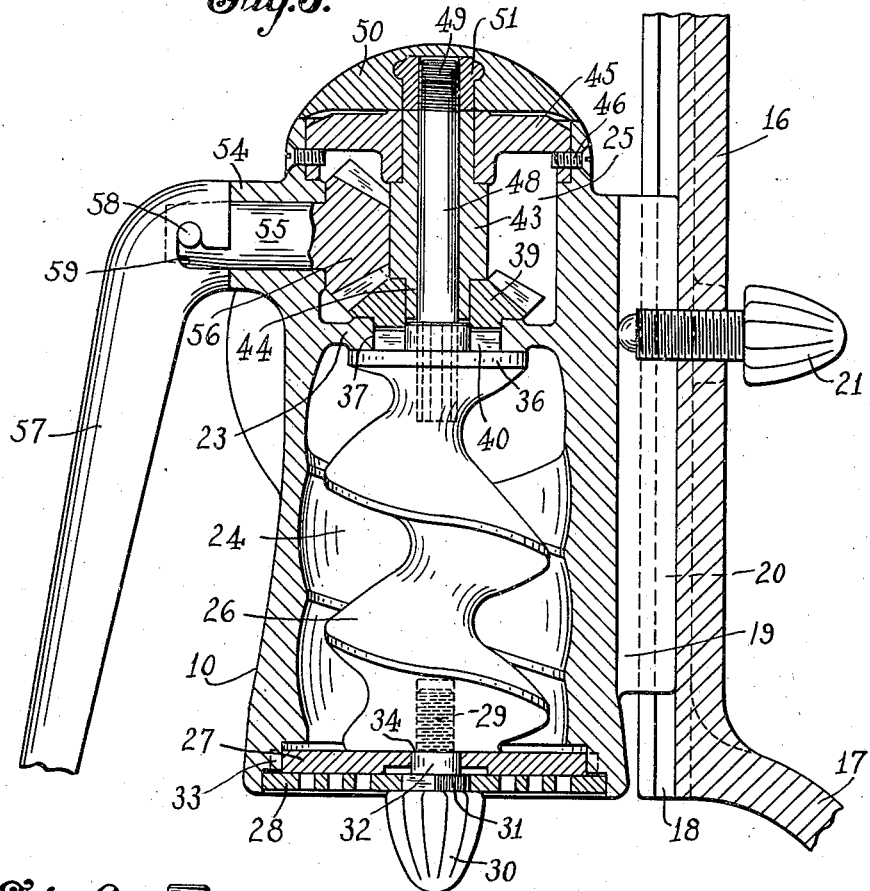
Fig. 5 is a sectional view on line 5—5 of Fig. 3.
Figure 6:
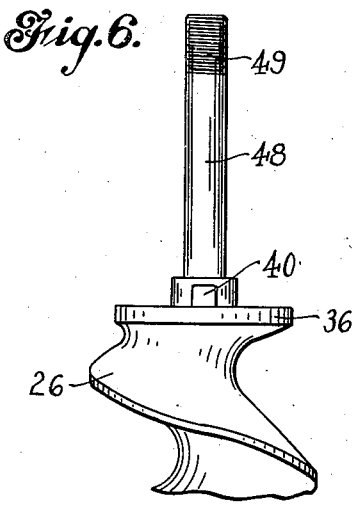
Fig. 6 is a view of the upper portion of the rotating screw.
Figure 7:
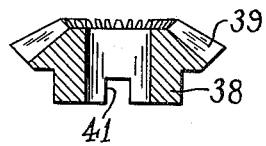
Fig. 7 is a sectional view of one of the gears used in the device.

To illustrate a preferred embodiment of my invention I have shown a food chopper comprising a casing or body 10 designed to be mounted in a vertical position upon a wall or other support 11. For this purpose mounting plates 12 are provided which are secured to the support 11 in spaced relation by screws 13. Each of the plates 12 is provided at its side edges with guideways 14, these guideways tapering downwardly and inwardly, as shown in Fig. 4, to receive a correspondingly shaped plate 15, which plates are secured respectively at the upper and lower ends of a supporting member or bracket 16 by connecting arms 17.

From the above description it will be apparent that the bracket 16 to which the food chopper is secured, as will be hereinafter described, may be removed from the mounting plates 12 by raising the plates 15 from the guideways 14, and may be again secured in place by simply dropping the plates into these guideways. It will be understood that the plates, being tapered to fit closely between the guideways, will be supported when inserted therein by reason of the fact that the guideways of each plate are closer together at their lower ends than at their upper ends.

The supporting member 16 is also provided with a guideway 18 at each side thereof, and a member 19 is secured to or formed integrally with the casing 10 and provided with outwardly projecting edges 20 which fit slidably in the guideways 18. A set screw 2 threaded into the member 16 is adapted to bear against the outer surface of the part 19 to secure the body 10 of the chopper in place. It will be seen that the chopper may be adjusted vertically of the supporting member 16 and secured in adjusted position when it is placed at the desired height by virtue of the screw 21.

As shown more especially in Fig. 5, the casing 10 is provided with a partition member 23 dividing the interior thereof into a food chamber or screw chamber 24 and a gear chamber 25. Within the former is rotatably mounted the usual feed screw 26 to the lower end of which is secured the cutter or knife 27 and a perforated plate 28 by means of a screw 29 threaded into the feed screw, which screw 29 has a head 30 by which it may be turned.

The screw is provided with a non-circular portion 31 which fits snugly a similarly shaped opening in the plate 28, so that this plate will rotate with the feed screw 26, and the screw 29 is also provided with a circular portion 32 upon which the knife 27 is mounted so that the screw 29 may rotate with respect to the knife. The knife is held against rotation by means of lugs 33 which are engaged with the walls of the casing upon opposite sides thereof to provide for relative rotation of the knife 27 and plate 28. The screw 29 may also be provided with a shoulder 34 which fits against the end of the feed screw 26 to prevent the threading of the screw 29 inwardly to such an extent as to cause binding of the parts and consequent holding of the feed screw against rotation.

At its upper end the feed screw is provided with a shouldered portion 36 to bear against the partition 23 and close the opening 37 therein, which opening is adapted to receive the hub 38 of a bevel gear 39. Also upon the shoulder 36 are provided oppositely disposed lugs or clutch members 40 to be received in openings 41 in the gear hub 38 to drivingly connect the gear and feed screw. It will be seen that the gear hub 38 fits rotatably in the opening in the partition member 23 and rests freely upon the upper side of this member.

Mounted on the upper surface of the gear 39 and extending upwardly therefrom is a bearing sleeve 43, which has a lower reduced end 44 received in the opening of the gear 39, and which is held in place at its upper end by a plate 45 secured interiorly of the casing by the screws 46.

A shaft 48 is secured to or formed integrally with the upper portion of the feed screw 26 and extends upwardly through the bearing sleeve 43, the upper end of the shaft projecting from this sleeve and being threaded on its projecting end as shown at 49. A cap 50 closes the upper end of the casing or body, which cap may be, if desired, formed of plastic material. A metallic bushing 51 is molded in this material and provided with internal threads so that the cap may be threaded upon the upper end of the shaft 48.

From the above construction it will be seen that the cap 50 may be unscrewed from the upper end of the shaft 48, at which time the feed screw, together with the perforated plate 28 and knife 27, may be withdrawn from the lower end of the casing 10 for cleaning, so that the parts may be readily disassembled and reassembled. The cap 50 thus serves to hold the feed screw and associated parts in place. When these parts are removed it will be apparent that the bearing sleeve 43 and gear 39 will be retained in position, as the shaft 48 merely slides downwardly through the sleeve 43.

Upon its front side the casing of the device is provided with a bearing sleeve 54 in which is rotatably mounted the shaft 55 of a bevel gear 56 disposed within the chamber 25, the teeth of which gear are in mesh with those of the gear 39. A handle 57 may be drivingly connected with the shaft 55. As shown, this connection consists of a bayonet joint comprising a pin 58 on the shaft and an L-shaped slot 59 in the handle within which the pin is received.

At one side of the casing a hopper 60 is provided, the hopper having an open mouth 61 at its upper end and communicating at its lower end, as at 62, with the food chamber 24 below the partition 23. It will be apparent that food products placed in the hopper 60 will drop by gravity into the upper end of the chamber 24, where they will be caught by the feed screw 26 and forced downwardly past the knife 27 and through the perforated plate 28. It will be apparent that the device may be readily mounted upon and removed from the supporting plates 12 by merely lifting the casing vertically and replacing it with a reverse movement. Moreover, the casing 10 may be adjusted vertically with respect to the supporting member 16 and also may be entirely removed from engagement with this supporting member by loosening the screw 21. Also the parts of the device which come in contact with the food products passed through the machine may be readily removed from the casing by merely unscrewing the cap 50, and thus permitting the feed screw, the knife and the perforated plate 28 to be drawn downwardly out of the casing. It will also be noted that, while the axis of the feed screw is vertically disposed, it is operated by a handle which rotates on a horizontal axis, the handle being connected to the feed screw in a simple manner and with parts which may be economically manufactured and assembled.

While I have shown and described a preferred embodiment of my invention, it will be understood that it is not to be limited to all of the details shown, but is capable of modification and variation within the spirit of the invention and within the scope of the claims.

What I claim is:

1. A food chopper comprising a casing, a feed screw rotatably mounted therein, means for mounting said casing upon a support with said screw disposed in a vertical position, a shaft rotatably mounted in the casing the axis of which is transverse to the axis of the screw, partition means in said casing forming a chamber for the feed screw and a gear chamber, gearing in said gear chamber connecting said shaft and screw, said gearing comprising a gear drivingly connected to said screw, a bearing sleeve suitably supported in the gear chamber above said gear, said screw having a shaft extending through said bearing, and means on the extended end of said shaft to retain the screw in the casing.

2. A food chopper comprising an integrally formed casing of substantially cylindrical shape, a feed screw rotatably mounted therein, means for mounting said casing upon a support with said screw disposed in a vertical position, a shaft rotatably mounted in the casing the axis of which is transverse to the axis of the screw, partition means extending transversely across the casing and forming therewithin a lower chamber for the feed screw and an upper gear chamber, said partition having an opening therein, a pair of meshing gears within said gear chamber connecting said shaft and screw, one of said gears having a hub rotatably received within said opening and engaged with the screw, a hopper communicating with said casing below the partition means, said screw having a shaft extending through the gear chamber, and means secured to said shaft at the upper end of the casing to hold the screw in place.

3. A food chopper comprising an integrally formed casing having an open lower end, a feed screw rotatably mounted therein and insertable into the casing through the open lower end thereof, means for mounting said casing upon a support with said screw disposed in a vertical position, a shaft rotatably mounted in the casing the axis of which is transverse to the axis of the screw, partition means extending transversely across the casing and forming therewithin a lower chamber for the feed screw and an upper gear chamber, said partition having an opening therein, a pair of meshing gears within said gear chamber connecting said shaft and screw, one of said gears having a hub rotatably received within said opening and engaged with the screw and the other gear being secured to said shaft, a hopper communicating with said casing below the partition means, said screw having a shaft extending through the gear chamber, and means secured to said shaft at the upper end of the casing to hold the screw in place.

4. A food chopper comprising a casing, a feed screw rotatably mounted therein, means for mounting said casing upon a support with said screw disposed in a vertical position, a shaft rotatably mounted in the casing the axis of which is transverse to the axis of the screw, partition means in the casing forming therewithin a lower chamber for the feed screw and an upper gear chamber, a gear having a hub rotatably carried by said partition, said hub having an opening therethrough, a shaft connected to said screw and extending upwardly through said opening, and a cap on the upper end of the gear chamber secured to the upper end of the shaft.

5. A food chopper comprising a casing, a feed screw rotatably mounted therein, means for mounting said casing upon a support with said screw disposed in a vertical position, a shaft rotatably mounted in the casing the axis of which is transverse to the axis of the screw, partition means in the casing forming therewithin a lower chamber for the feed screw and an upper gear chamber, a gear having a hub rotatably carried by said partition, said hub having an opening therethrough, a shaft connected to said screw and extending upwardly through said opening, a sleeve in the gear chamber in which said shaft is journaled, and a cap on the upper end of the gear chamber secured to the upper end of the shaft.

HERBERT W. BROOKS.